(12) United States Patent
Choi

(10) Patent No.: US 10,101,805 B2
(45) Date of Patent: Oct. 16, 2018

(54) NON MOTORIZED OMNI DIRECTIONAL WALKING SYSTEM DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/724,863

(22) Filed: Oct. 4, 2017

(65) Prior Publication Data
US 2018/0101224 A1   Apr. 12, 2018

(30) Foreign Application Priority Data

Oct. 7, 2016   (KR) .......................... 10-2016-0129469

(51) Int. Cl.
*G06F 3/01*   (2006.01)
*A63B 69/00*  (2006.01)

(52) U.S. Cl.
CPC .......... *G06F 3/011* (2013.01); *A63B 69/0035* (2013.01); *A63B 2220/13* (2013.01); *A63B 2220/31* (2013.01); *A63B 2220/803* (2013.01); *G06F 2203/012* (2013.01)

(58) Field of Classification Search
None
See application file for complete search history.

(56) References Cited

U.S. PATENT DOCUMENTS

| | | | |
|---|---|---|---|
| 6,131,075 A * | 10/2000 | Tai .......................... | A63B 24/00 434/11 |
| 6,135,928 A * | 10/2000 | Butterfield .............. | G06F 3/011 482/66 |
| 6,152,854 A | 11/2000 | Carmein | |
| 6,176,817 B1 * | 1/2001 | Carey ..................... | A63B 22/18 482/146 |
| 6,563,489 B1 * | 5/2003 | Latypov .................. | G06F 3/011 345/156 |
| 6,743,154 B2 * | 6/2004 | Epstein ................... | A63B 22/02 482/51 |
| 7,780,573 B1 * | 8/2010 | Carmein ............ | A63B 22/0242 482/4 |
| 9,329,681 B2 * | 5/2016 | Goetgeluk .............. | G06F 3/011 |
| 9,785,230 B2 * | 10/2017 | Goetgeluk .............. | G06F 3/011 |
| 9,821,465 B2 * | 11/2017 | Stephens, Jr. .......... | B25J 9/1689 |
| 2007/0109259 A1 * | 5/2007 | Liu .......................... | G06F 3/011 345/156 |

(Continued)

FOREIGN PATENT DOCUMENTS

KR   10-1439175 B1   9/2014
WO   2010/089618 A2   8/2010

*Primary Examiner* — Stephen R Crow
(74) *Attorney, Agent, or Firm* — Bacon & Thomas, PLLC

(57) ABSTRACT

A walking system that includes a walking dish formed in any one of a circular shape, a semi-circular shape, and a polygonal shape; a rolling ball formed on an upper surface of a ball fixing device; multiple auxiliary balls having multiple rolling balls on the surface of the walking dish and formed below the rolling ball so that the rolling ball smoothly rotates in all directions in 360 degrees; the ball fixing device fixing the auxiliary ball and the rolling ball while allowing the auxiliary ball and the rolling ball to rotate in all directions in 360 degrees; and a ball fixing table formed with the ball fixing device for joining the multiple ball fixing devices on the inclined surface at a predetermined interval to allow a user to walk in all directions in 360 degrees according to a virtual reality or walking motion image.

12 Claims, 8 Drawing Sheets

(56) References Cited

U.S. PATENT DOCUMENTS

| 2009/0111670 | A1 | | 4/2009 | Williams | |
|---|---|---|---|---|---|
| 2013/0132910 | A1 | * | 5/2013 | Belmon | G06F 3/011 |
| | | | | | 715/850 |
| 2015/0321337 | A1 | * | 11/2015 | Stephens, Jr. | B25J 9/1689 |
| | | | | | 700/257 |
| 2018/0101224 | A1 | * | 4/2018 | Choi | G06F 3/011 |

* cited by examiner

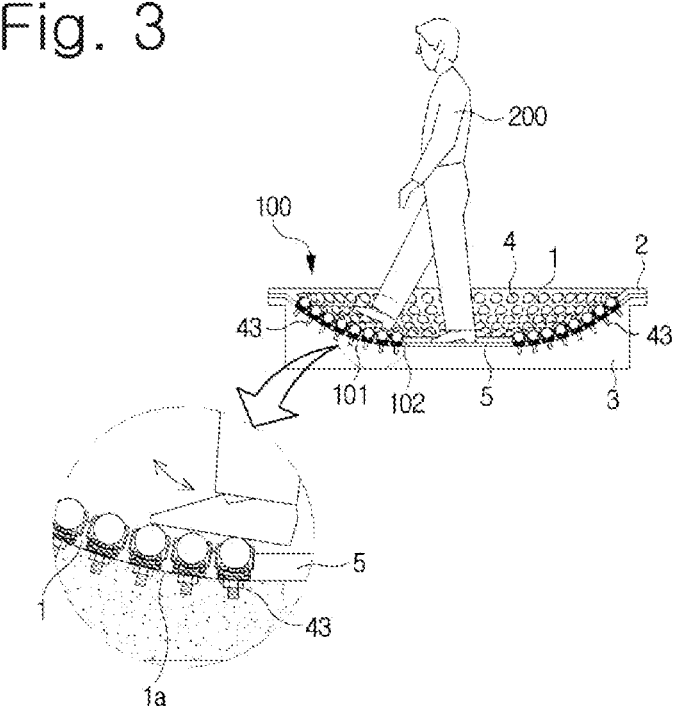

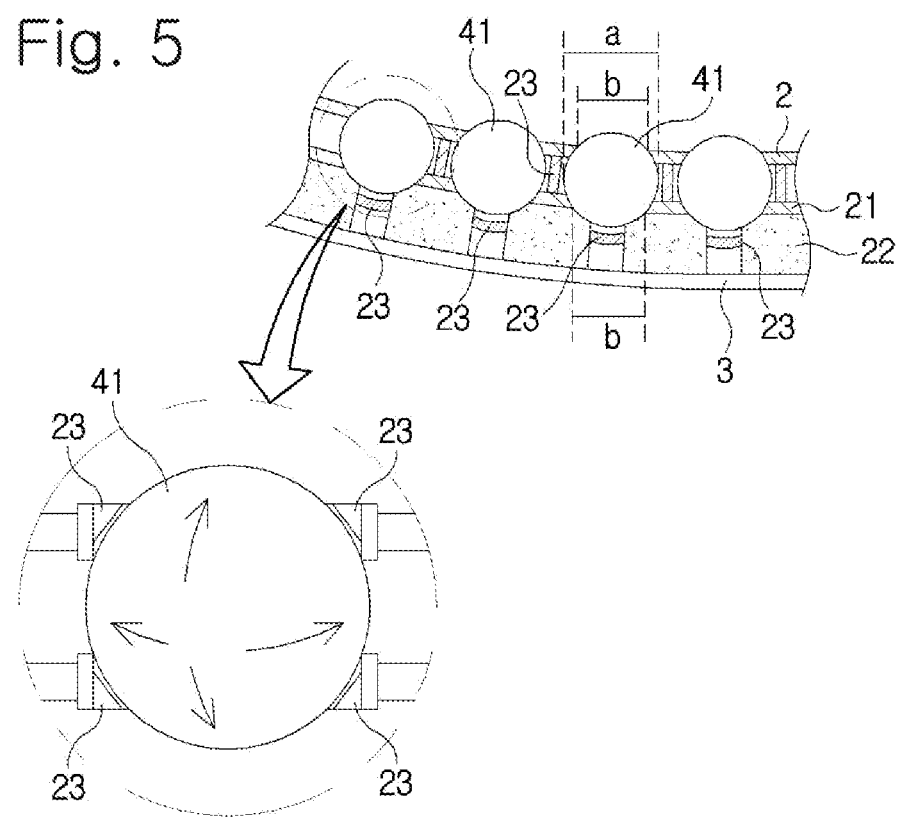

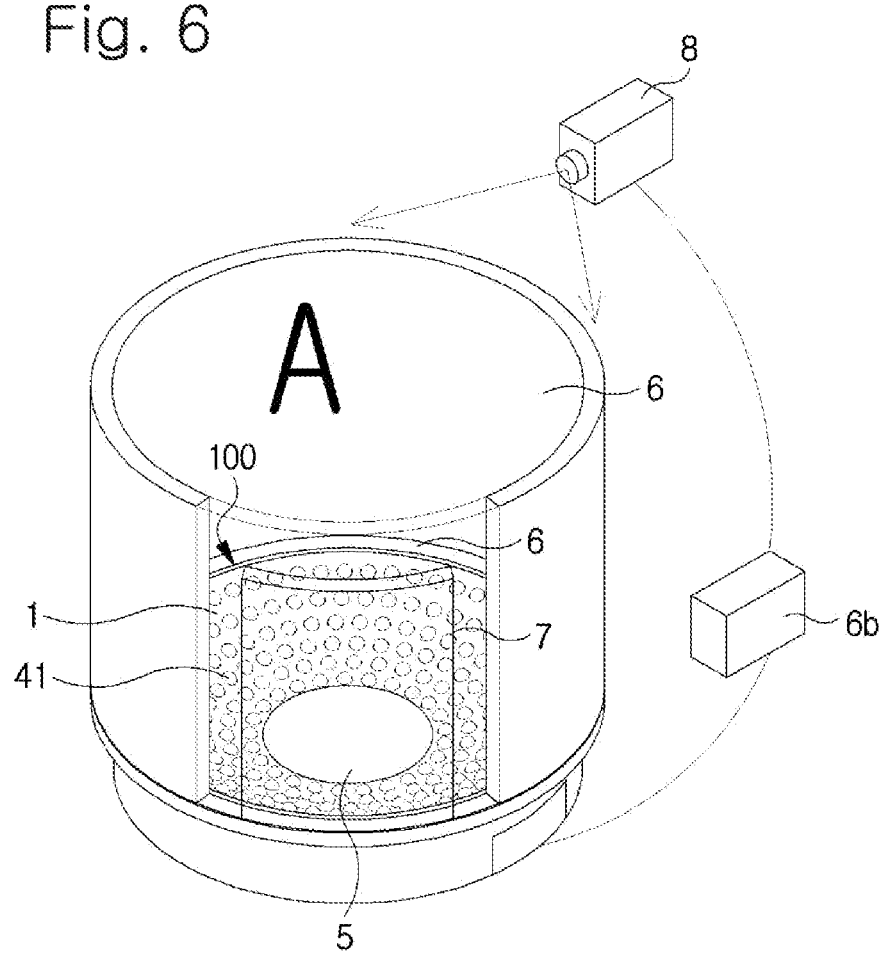

NON MOTORIZED OMNI DIRECTIONAL WALKING SYSTEM DEVICE

CROSS-REFERENCE TO RELATED APPLICATION(S)

This application claims benefit of priority to Korean Patent Application No. 10-2016-0129469 filed on Oct. 7, 2016 in the Korean Intellectual Property Office, the disclosure of which is incorporated herein by reference in its entirety.

BACKGROUND OF THE INVENTION

The present invention relates to a non motorized omni-directional walking system which allows a user to walk in all viewing-angle directions while viewing a virtual reality image and a walking exercise image, and particularly, includes a motor, a servo motor, a conveyor belt, a rotating ball structure without a folded floor structure.

DESCRIPTION OF RELATED ART

A virtual reality image refers to a device that provides images in all visual directions, e.g., in 360°, and provides virtual reality images in all desired directions of the user to a screen of a computer or the like while walking. Accordingly, the user should be able to walk in a limited position in any desired visual direction while viewing the virtual reality image.

In Korean Patent Application No. 10-2013-0000742 (Virtual reality walking platform system and method using an omni-directional floor) and PCT/HU 2010/000016 (WALKING PLAT FORM ESPECIALLY FOR VIRTUAL REALITY SYSTEM), the systems have a structure in which a roller bar type roller is driven by a motor to obtain an walking effect in all directions, but the bar roller can only be operated in a predetermined direction due to a characteristic in which it rotates only in one direction, and it is impossible to move finely and in all directions.

Further, an omni-directional running machine structure in U.S. Pat. No. 6,152,854 is movable in left and right forward and backward directions or only in four designated directions of front, rear, left and right. In addition, the belt is connected with a motor driving device to be movable in the four directions of front, rear, left, and right. All rotating rollers are driven by an electric driving unit such as an electric motor, a universal joint, a rotating bolt, a roll, and the like which drives the rotating rollers.

Therefore, in the conventional virtual reality walking structure, all of the walking structures can move only straightly in a polygonal direction so that the person cannot minutely freely move in any direction, that is, in all diagonal directions in 360 degrees as provided in virtual reality. Since the person moves by power using an electric motor, a minute movement speed, adjustment, or the like is not natural and driving by the electric motor causes large noise and requires a soundproofing device which a complicated structure to prevent noise.

In addition, US 2009/0111670A is constituted by a friction sensor and a piezoelectric sensor (Mechanism for red using friction) on a floor, but only a walking position is retrieved, and the user can not obtain the movement effect of walking in place.

Since conventional walking structures for VR are all power driven, the users need to adjust the structures so that it is possible to walk in the direction in which the motor is driven by sending a signal to the motor in a pre-calculated direction. There are many limitations on operation elements, such as stopping the motor by turning off a switch, so that there are many restrictions on the walking motion required by the virtual reality image and inconvenient in use.

In addition, the complicated driving device by the motor is noisy, which limits the installation place such as an apartment, an office, or the like and/or requires a complicated device to eliminate such noise.

SUMMARY OF THE INVENTION

An aspect of the present invention provides a method so that a pedestrian is able to walk freely in accordance with the intention of the pedestrian and not in a predetermined direction but in all directions in 360 degrees and move diagonally without being power driven and/or without a roller, a motor driving the roller, a configuration of a belt, a floor, and an electric driving device.

According to an aspect of the present invention, a non motorized omni-directional walking system device is provided, which includes: a walking dish formed in any one of a circular shape, a semi-circular shape, and a polygonal shape; multiple rolling balls formed on the surface of the walking dish, in which a stop surface is formed at the center or on one side of the walking dish and an inclined surface is formed on the periphery of the walking dish, and the rolling ball is configured in a spherical shape with a radius of 1 to 50 mm, which has a precise curvature; multiple auxiliary balls constituted by multiple rolling balls on the surface of the walking dish and formed below the rotation ball so that the rolling ball smoothly rotates in all directions of 360 degrees in up, down, left, and right directions; a ball fixing device that fixes the auxiliary ball and the rolling ball so that they are not to be separated from predetermined positions while allowing the auxiliary ball and the rolling ball to rotate in all directions of 360 degrees in up, down, left, and right directions; and a ball fixing table formed below the ball fixing device, which is used for joining the multiple ball fixing devices on the surface of the inclined surface at a predetermined interval to allow a user to walk in all direction in 360 degrees in forward, backward, left, and right directions according to a virtual reality or walking motion image based on a stop surface of the walking dish.

Further, in the structure of the ball fixing device, a groove is formed between two upper and lower plate cases 2 and a rolling ball 41 is provided therebetween, and a rotation control device such as urethane or magnet is formed below the rolling ball 41.

In addition, the non motorized omni-directional walking system device is configured by combining the walking dish, and an image screen and an image device constituted by a projector or an OLED or LCD image device.

According to an exemplary embodiment of the present invention, unlike a method that senses a walking movement speed of a user and transfers the sensed walking movement speed to a motor to adjust a rotational speed as in the related art, a pedestrian may move by an inclined surface and a rotation ball using pressure from walking itself and naturally walk in a quick pace, race walking, easy walking, and the like in a predetermined direction and in all directions in 360 degrees.

In addition, since the rotation ball has an effect of automatically adapting and rotating according to the walking speed and direction of the pedestrian without electric driving, instantaneous turning of a walking direction and a movement speed may be automatically changed.

Therefore, since the rotation ball moves according to the intentions of the pedestrian in terms of movement, stopping, and speed, the structure is simple and the pedestrian may move and walk in all angles in 360 degrees and in all directions including a diagonal direction, and the like without a driving device driven by power, such as a roller, a universal joint motor, or the like, and there is no limit in installation space.

BRIEF DESCRIPTION OF THE FIGURES

The above and other aspects, features, and advantages of a non motorized omni-directional walking system device in which:

FIG. 3 is an explanatory diagram in which the present invention is used.

FIG. 4A is an explanatory diagram of a walking direction such as a diagonal direction, or the like.

FIG. 5 is an explanatory diagram of an example of implementation of a rotation ball structure.

FIG. 6 is an explanatory diagram of an example of implementation in combination with a screen.

DETAILED DESCRIPTION OF THE INVENTION

Figure 1:
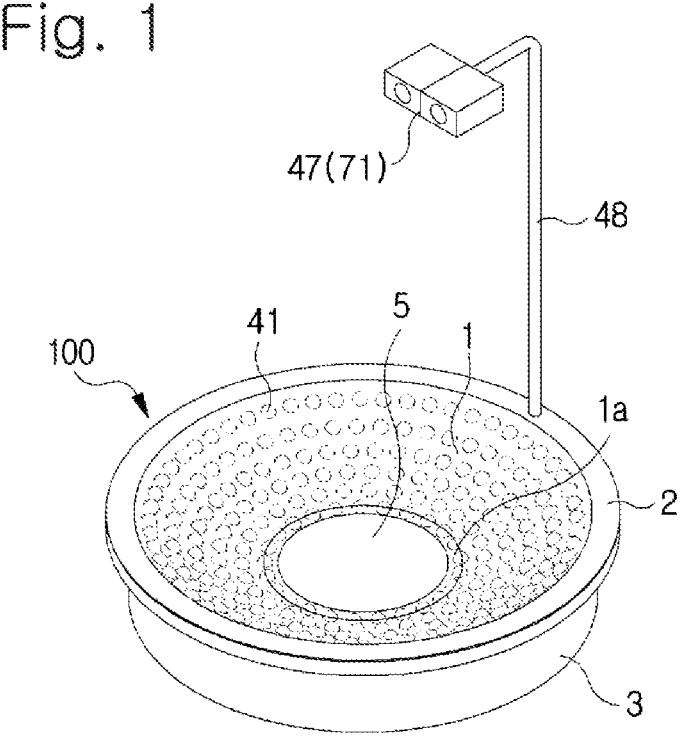
FIG. 1 is an explanatory diagram in which the present invention is implemented.
Figure 2:
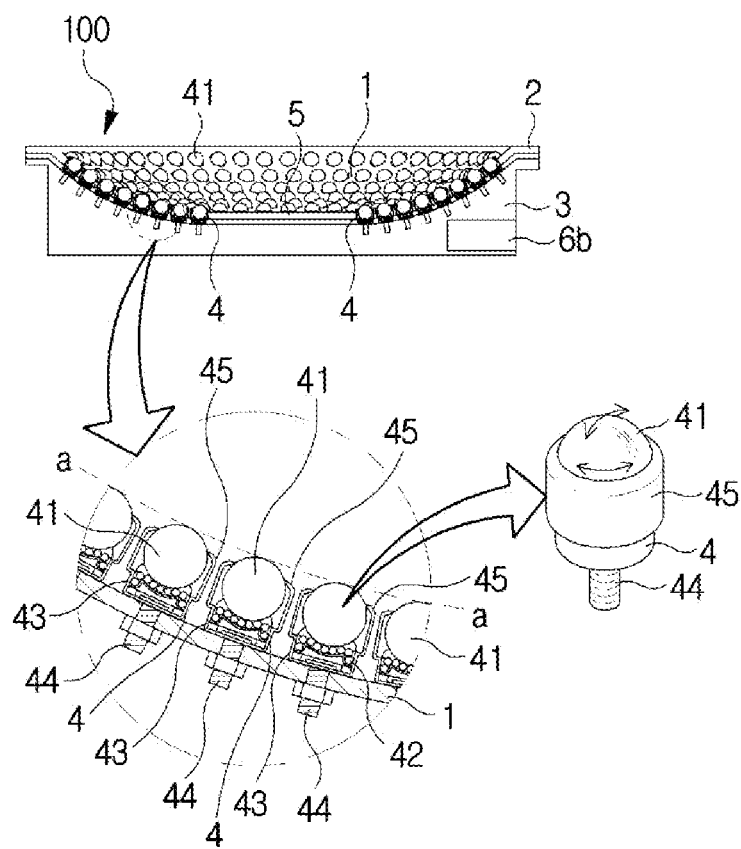
FIG. 2 is an explanatory diagram in which a structure of FIG. 1 is described in a cross section.

As illustrated in FIGS. 1 and 2, a non motorized omni-directional walking system device includes a walking dish 100 having an inclined surface 1 formed in the periphery thereof and a dish or a semi-dish shape formed by a flat surface at the center or on one side, a rolling ball 41 structure in which multiple rolling balls 41 are formed on the inclined surface 1 and are rolled in all 360 degree directions, which include left, right, front, and rear diagonal line directions, an auxiliary ball (42) structure which is configured with the lower part of the rolling ball (41) structure and with a lower part of each of the multiple ball fixing devices 4, and a sensor (43) structure which is configured in the lower part of the auxiliary ball structure 42 as necessary.

The shape of the walking dish 100 may be in various shapes, for example, in a circular shape, a semi-circular shape, a polygonal shape, and the like according to the purpose of the invention. That is, the inclined plane 2 of the walking dish 100 is formed of a metal or wood structure, and is formed in a polygonal shape such as a square or hexagonal shape, a part of the circular or polygonal shape, or a case 2 of a part of the circular shape constitutes the inclined surface 1 in which a stop surface 5 is provided at a part of an inner surface of the inclined surface 1 and a lower fixation table 3 is configured below the inclined surface 1 so as to stably fix the walking dish 100.

As illustrated in FIG. 2, the rolling ball 41, the auxiliary ball 42, and the rolling ball fixing table 45 constitute a ball fixing device 4 configured as one structure.

The rolling ball 41 has a spherical shape with a precise curvature and is constituted by the auxiliary ball 42 which is formed in the lower part of the rolling ball structure to allow smooth rotation in all 360 degree directions, e.g., up, down, left, and right, and the ball fixing device 4 fixes the rolling ball 41 so that it cannot be separated from a predetermined position while rotating in all directions of 360 degrees up, down, left, and right.

A rolling ball fixing table 45 is formed with the ball fixing device 4 in order to combine and configure a plurality of the ball fixing devices 4 onto the inclined surface 1 of the walking dish 100 at predetermined intervals.

Meanwhile, it is recommended that an inclination angle of the inclined plane 1 is set within an angle of not less than 10 degrees and not more than 60 degrees, so that it does not interfere with walking, as illustrated in FIG. 3, but preferably, when a person walks, be set at a natural angle at which the person lifts a right foot R based on a left foot L is configured with an angle of 10 to 30°.

That is, it is also possible to form an inclined surface with a curved surface such as a rotation axis on which the left and right feet L and R rotate with the human's hip as a base.

When the rolling ball 41 rotates more than the user's walking speed without any control, a pedestrian 200 slides on the inclined surface 1, so that the walking speed may not be arbitrarily adjusted.

When braking force is applied to a rotational speed of the rolling ball 41, it is less slippery. Therefore, it is easy to walk back into an original place.

As illustrated in FIG. 2, the same effect as that of a tread machine is obtained in which the walking direction of the walking dish 100 is returned to its original position while walking in all 360 degree directions on the inclined surface 1 of the walking dish 100.

As illustrated in FIG. 2, the ball fixing device 4 in which the rolling ball may rotate in all direction in 360 degrees are formed on the inclined surface 1 at a predetermined interval.

Such a rolling ball 41 is formed in a complete sphere and a diameter of the rolling ball 41 may be between 1 mm and 50 mm, but preferably 10 mm.

The structure of the ball fixing device 4 is configured such that the rolling ball 41 is inserted into the rolling ball fixing table 45 so as to prevent the rolling ball 41 from being released to the outside as illustrated in FIG. 2 and a groove is configured so that the rolling ball 41 is exposed to the outside and freely rotates and the diameter of the groove is smaller than the diameter of the rolling ball 41, but a height of the rolling ball 41 is the largest.

That is, when the diameter of the rolling ball 41 is 10 mm, the groove diameter of the rolling ball fixing table 45 is appropriately 9 mm.

A radius of the rolling ball 41 formed on the surface of the walking dish 100 is not limited, but preferably between 1 and 50 mm.

As illustrated in FIG. 3, a result of a comparative test between an area which contacts a sole and a rolling action of the sole are most appropriately 10 to 25 mm.

The structure of the case 2 of the walking dish 100 having the inclined surface 1 and the stop surface 5 is configured as follows as illustrated in FIG. 3. When the user moves on foot, a movement interval of the left and right foot L and R varies depending on the user's physique, weight, and walking purpose, but is usually 40 to 80 cm.

The stop surface 5 has a suitable size of 40 to 60 cm circular range and the width of each of the front and rear inclined surface 1 is 30 to 80 cm, but the size may be adjusted according to the purpose of use.

Therefore, the size of the walking dish 100 as a whole is 100 to 200 cm. Preferably, the diameter is 150 cm. Such a size is just one example and is not limited.

A plurality of ball fixing tables 45 are fixed on the inclined surface 1 at regular intervals on all the surfaces of the inclined surface 1 as illustrated in FIGS. 1, 2, 3 and 4, e.g., using fastening ends 44 which, for example, can be screws or nut and bolt assemblies.

When the ball fixing table 45 is constituted by a rolling ball 41 having a diameter of 10 mm in which a mutual fixation interval is preferably ½ of the diameter of the rolling ball 41. That is, in the case of the rolling ball 41 of 10 mm, the interval is between 10 mm to 5 mm, but the interval may be adjusted according to the purpose.

When the rolling ball 41 is configured to have a diameter of 10 mm, the rolling ball 41 is exposed from the rolling ball fixing table 45 with a maximum of about 4 mm or more and as illustrated in FIG. 2B, a horizontal plane a is formed by the height of the rolling ball 41. The rolling ball 41 having such a structure rotates in all directions of 360 degrees by the auxiliary ball 42 therebelow.

A necessary number of auxiliary balls 42 which smaller in diameter than the rolling balls 41 are formed in the ball fixing table 45, that is, below the rolling ball 41 and a sensor device 43 such as an electric charge sensor or a movable sensor is configured and connected below the auxiliary ball 42. The sensors may be selected and used from the existing sensors which are known, which include acceleration sensors, magnetic force sensors, pressure sensors, movable sensors, proximity sensors, and the like according to the purpose and positions can be photographed using a camera sensor without such a sensor to configure the sensors through connection with a computer 6b during movement.

As illustrated in FIG. 3, when the pedestrian 200 starts a walking operation by projecting the left foot L of the left and right feet L and R on the inclined surface 1 on the stop surface 5 configured by a plane, since the plurality of rolling balls 41 that are in contact with the bottom of a foot surface rotate by an inclination angle of the inclined surface 1, the left foot L slides and returns to the stop surface 5 and when the pedestrian 200 projects the right foot R on the inclined surface 1, the right foot R returns to the stop surface 5 similarly to the left foot L. That is, the left and right feet L and R are continuously operated in succession on the basis of the position of the stop surface 1 to continuously walk in place. In this case, the sensor 43 senses a weight of a user applied to the rolling ball 41 and transmits the sensed weight to the computer and the computer accordingly detects and provides an image corresponding to the corresponding viewing angle of the user 200 among the input virtual reality images.

That is, the distance is measured by the sensor device 43 such as the pressure sensor configured below the ball fixing device 4 or the sensor 47 such as the camera configured above the ball fixing device 4 and distance measurement by a movement direction and the number of movement times is calculated by the computer (not illustrated) configured in the waling fish 100 and the viewing angle of the image and the speed of the image corresponding to a virtual reality image are adjusted in connection with the virtual reality image.

That is, a virtual reality image corresponding to a scene in which the movement of the user 200 is detected by the sensor device 43 configured by the pressure sensor, a position sensor, a speed sensor, and the like is provided.

Figure 4A:
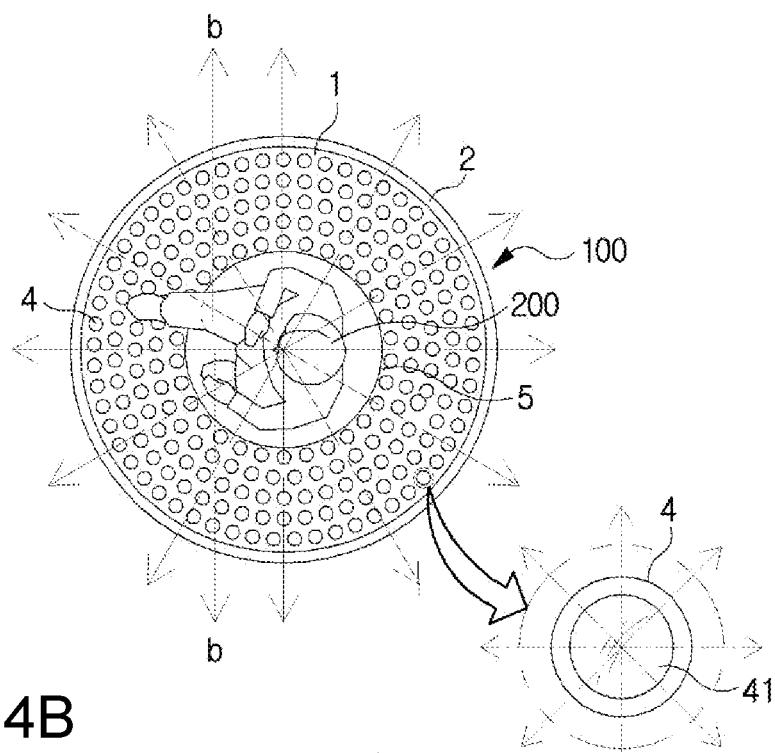
Figure 4B:
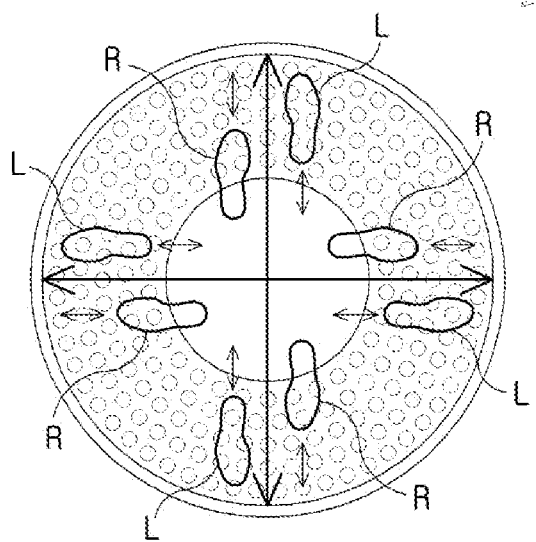
FIG. 4B is an explanatory diagram of a walking direction in all directions.

Accordingly, since the rolling ball 41 of the ball fixing device 4 rotates in all directions in 360 degrees as illustrated in FIG. 4, the user 200 may walk in place in all directions in 360 degrees required by the virtual reality image since the ball fixing device 4 allows the rolling ball to rotate in all the 360° directions required by the virtual reality image and such a walking motion is sensed by the sensor 43 below each ball fixing device 4.

The sensor device 43 is not required when the present invention is used for the purpose of a walking device of a non-powered silent device in an apartment, an office, or the like.

As illustrated in FIG. 5, in the ball fixing device 4, the auxiliary plate 21 is configured in the case 2 structure below the inclined surface 1, the rolling ball 41 is configured between the auxiliary plates 21, and a braking material 22 having good adsorption and abrasion, such as urethane is configured below the rolling ball 41.

Further, a material of the rolling ball 41 may be constituted by a plastic material having high abrasion such as nylon, urethane, or silicone, so that noise may be reduced when the rolling ball 41 is used.

A sound absorption material having good sound absorption such as urethane, rubber, silicone rubber, or the like is filled between the ball fixing devices 4, except for above the ball fixing device 4, since the rolling ball 41 is exposed to the surface of the inclined surface 1 illustrated in FIGS. 1 and 2, to reduce noise generated from an entire structure of the walking dish 100.

Meanwhile, the rolling ball 41 rotates in all directions in 360 degrees, but the rotational speed is appropriately controlled. Therefore, the rolling ball 41 may be gently configured at an inclination angle of less than 10 to 30° and straight movement and diagonal movement are available.

The radius of the rolling ball 41 formed on the surface of the walking dish 100 is not limited, but preferably between 1 and 50 mm.

As illustrated in FIG. 3, a result of a comparative test between an area which contacts a sole and a rolling action of the sole are most appropriately 10 to 25 mm.

The structure of the case 2 of the walking dish 100 having the inclined surface 1 and the stop surface 5 is configured as follows as illustrated in FIG. 3. When the user moves, a movement interval of the left and right foot L and R varies depending on the user's physique, weight, and walking purpose, but is usually 40 to 80 cm.

Meanwhile, the stop surface 5 has a suitable size of 40 to 60 cm circular range and the width of each of the front and rear inclined surface 1 is 30 to 80 cm, but the size may be adjusted according to the purpose of use.

Therefore, the size of the walking dish 100 as a whole is 100 to 200 cm. Preferably, the diameter is 150 cm. Such a size is just one example and is not limited.

The present invention may be used as a walking motion device. In this case, the walking motion device should be able to be installed and used in the apartments and the offices. In this case, the most problematic is the interstory noise and the noise generated during use. In order to solve this problem, the waling motion device may be installed and used in the apartments and the offices by filling a sound absorbing material, such as urethane or sponge, between the plurality of ball fixing devices 4 and into the lower part of the ball fixing device 4 in order to the reduce noise.

However, all conventional devices such as the treadmill are forced to make a positional return by driving a motor and the noise is large, electrical consumption is large, a volume is large, and components are a lot, and as a result, the conventional devices are not economical and have many failures. The present invention may perform the positional return without a driving motor.

As illustrated in FIG. 6, the present invention includes a screen 6 having a circular shape or a polygonal shape such as a square shape, a hexagonal shape, or the like provided on the periphery of an upper surface of the walking dish 100, and the virtual reality image may be provided by a projector 8 or may be combined with all image structures such as display image such as OLED, LED, LCD, etc., having the circular shape or the polygonal shape such as the square shape, the hexagonal shape, or the like.

Figure 7:
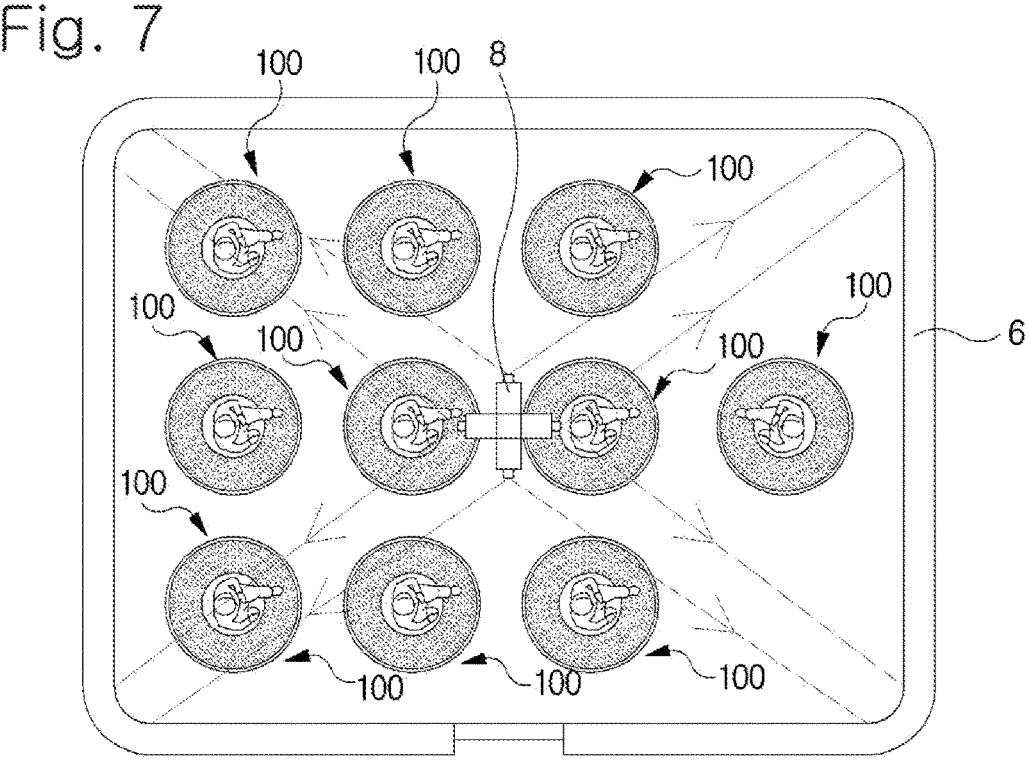
FIG. 7 is an explanatory diagram when multiple persons simultaneously move in a square place.
Figure 8:
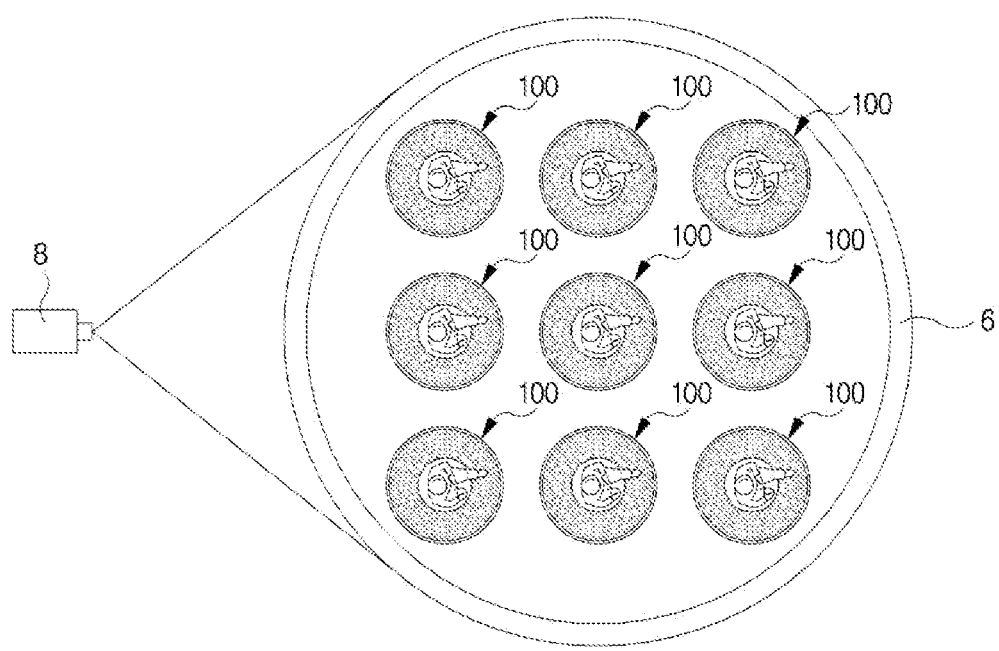
FIG. 8 is a use explanatory diagram when multiple persons are simultaneously used in a circular place.

In addition, as illustrated in FIGS. 7 and 8, the entire wall surface of a predetermined room is provided with a video display or a circular or polygonal screen or project of 360 degrees and provided with the plurality of walking dishes 100, and as a result, several persons may perform practice exercises such as exercising, games, or combat training while watching one virtual reality or walking motion image.

Further, the motion of the user 200 of the present invention may capture a motion by an image motion sensor 71 as illustrated in FIG. 1 and provide an image corresponding to the position. Therefore, in the structure of the present invention as described above, a plurality of users 200 may move and walk freely in all directions, without electricity, motor, or the like.

The rolling ball 41 of the inclined surface 1 having the horizontal plane a does not move only in a predetermined direction as in the conventional walking device, but the user 200 may walk in all directions in 360 degrees forward, backward, left, and right and move diagonally by the rolling ball 41. As such, the user 200 may walk in all directions in which he/she wants to move while viewing the virtual reality image.

As illustrated in FIG. 5, when the rolling ball 41 is made of a magnetic metal, having a magnetic property, a magnet 23 may be formed below the rolling ball 41 instead of the auxiliary ball 42. In this case, the magnet 23 may appropriately adjust the rotation of the rolling ball 41, so that the walking speed may be appropriately adjusted.

Further, the structure of the present invention is such that the inclined plane 1 is formed in two stages as illustrated in FIG. 2 and an intermediate inclined surface 1a in which the inclination angle is relaxed more than the inclined surface 1 is provided between the inclined surface 1 and the stop surface 5, so that the left and right feet L and R of the user 200 on the way of walking return to the stop surface 5 naturally via the inclined surface 1 and the intermediate inclined surface 1a.

The structure of the ball fixing device 4 of the intermediate inclined surface 1a may change the diameter of the rolling ball 41 or adjust the rotational speed of the rolling ball 41.

Depending on the purpose of use, the size and shape of the waling dish 100 may be configured as a circular shape and a polygonal shape such as a fan shape, a square shape, a hexagonal shape, or the like, as long as the shape of the walking plate 100 is configured as described above. Even in this case, since the rolling ball 41 may rotate in all directions in 360 degrees, only a walking width is reduced, and the walking direction may be arbitrarily all 360 degree directions.

Therefore, the present invention has the same effect as that of a treadmill that returns to its original position even when walking in the walking dish 100. However, in the conventional method in which the walking system returns to the forward position by being driven with the motor, the user may arbitrarily walk in all directions 360 degrees and walk diagonally and may be used as a noise-free device. Therefore, the present invention may be used for a variety of purposes such as virtual reality video walking system, virtual reality video game, virtual sightseeing tour equipment, and walking exercise equipment for use in the office or the apartment.

What is claimed is:

1. A non motorized omni-directional walking system device comprising:
   a walking dish having a dish shape;
   an inclined surface having an inclination angle lowered gradually from a surrounding of the walking dish toward an inner surface of the walking dish;
   a stop surface provided as a flat surface at a center of the inclined surface;
   a plurality of ball fixing devices arranged on the inclined surface of the walking dish at a predetermined interval;
   a rolling ball having a curvature provided on an upper surface in each of the ball fixing devices, wherein a part of each rolling ball is exposed to an inside of respective ball fixing device and each of said ball fixing devices comprises a groove configured so that another part of the rolling ball is exposed to an outside of the respective ball fixing device; and
   a fixing means for fixing the plurality of ball fixing devices and rolling balls to the walking dish while the rolling ball rotates up and downward and left and rightward directions in all 360 degree directions, wherein the inclined surface and rolling balls are configured in a way such that a user is able to walk in up and downward and left and rightward directions from the stop surface in all 360 degree directions without a separate power device.

2. The non motorized omni-directional walking system device of claim 1, wherein the ball fixing devices comprise urethane or a magnet formed below each rolling ball.

3. The non motorized omni-directional walking system device of claim 1, wherein a sound absorption material is provided on the periphery and below the ball fixing device to reduce noise.

4. The non motorized omni-directional walking system device of claim 1, wherein the non motorized omni-directional walking system device is combined with an imaging device.

5. The non motorized omni-directional walking system device of claim 2, wherein a sound absorption material is provided on the periphery and below the ball fixing device to reduce noise.

6. The non motorized omni-directional walking system device of claim 2, wherein the non motorized omni-directional walking system device is combined with an imaging device.

7. The non motorized omni-directional walking system device of claim 3, wherein the non motorized omni-directional walking system device is combined with an imaging device.

8. The non motorized omni-directional walking system device of claim 1, wherein the walking dish is configured as one of a circular shape, a semi-circular shape and polygonal shape.

9. The non motorized omni-directional walking system device of claim 1, wherein a movement of a user is sensed by a sensor and is connected to a virtual reality image.

10. The non motorized omni-directional walking system device of claim 8, wherein a movement of a user is sensed by a sensor and is connected to a virtual reality image.

11. The non motorized omni-directional walking system device of claim 2, wherein a movement of a user is sensed by a sensor and is connected to a virtual reality image.

12. The non motorized omni-directional walking system device of claim 3, wherein a movement of a user is sensed by a sensor and is connected to a virtual reality image.

* * * * *